2,789,980
PROCESS FOR PRODUCING CYANOPYRIDINE CARBOXAMIDE

John V. Scudi, Springfield, N. J., Bernard F. Duesel, Yonkers, N. Y., and George Mayurnik, Garfield, N. J., assignors, by mesne assignments, to Warner-Lambert Pharmaceutical Company, Morris Plains, N. J., a corporation of Delaware No Drawing. Application August 4, 1954,
Serial No. 447,914

6 Claims. (Cl. 260—294.9)

This invention relates to the production of cyanopyridine carboxamides, that is, derivatives of pyridine in which one hydrogen atom of the pyridine ring is substituted by a cyano group, and another hydrogen atom is substituted by a carboxamide group.

According to known procedures, the introduction of the carboxyl- and cyano- groups into the pyridine ring can be effected but only by utilizing several steps. For instance, pyridine may be sulfonated and the sulfonic acid exchanged with the cyano group by fusing the pyridine sulfonic acid with alkali cyanides. Alternatively, pyridine may be aminated with sodium amide, the amino group replaced with chlorine, and the chlorine replaced with cyanides thereby producing the cyanopyridines.

We have now found that we can convert dialkylpyridines in a one-step operation into cyanopyridine carboxamides. These new pyridine-CN derivatives have various utilities without modification or are readily convertible into compounds useful in the synthesis of various pharmaceuticals and other chemical compounds and intermediates.

Broadly considered, the present invention relates to the production of cyanopyridine-carboxamide derivatives by contacting vapors of a dialkyl pyridine, ammonia and an oxygen-containing gas with a catalyst composed of an oxide or a salt of the elements of the fifth, sixth and eighth group of the periodic system, at an elevated temperature which varies with the particular dialkyl pyridine treated or the particular catalytic agent used.

As initial material for the operation of the process of the invention dialkylpyridines including alpha-substituted dialkylpyridines may be used, and the alkyl chain may be of any length. Among the materials suitable, there may be mentioned the lutidines, that is, the isomeric dimethylpyridines, the collidines of the methyl-ethyl type; also dialkylpyridines with a longer side chain, like methyl-, butylpyridines.

Particularly suitable sources are by-product dialkylpyridines, which ordinarily have not more than four carbon atoms in any alkyl substituent on the pyridine ring and aldehyde-collidine (2-methyl, 5-ethylpyridine), obtained by condensation of paraldehyde and ammonia.

The oxides and salts of the elements of the fifth, sixth and eighth group of the periodic system may be employed singly or mixed, either as two or more different oxides, or as two or more different salts, or as one or more oxides with one or more salts. The activity of these catalysts can be regulated by the addition of carriers, promoters or retarders to accomplish partial oxidation and nitrogen substitution, and in every case the catalyst or catalytic mixture employed must of course be of a character which avoids complete oxidation of the dialkylpyridine.

In accordance with a specific embodiment of the invention an oxide of an element of the stated groups is employed in combination with an alumina support. The alumina serves to promote the reaction particularly by improving the yield of the desired product.

The catalysts may be prepared from their soluble salts by precipitation, the precipitate being thereafter either dried and granulated to produce the salt catalyst, or calcined in an oven and granulated to provide the oxide catalyst. In either case the granules are suitably of ten mesh size. Alternatively, the precipitate may be mixed with a suitable binder and prepared in the form of pills, tablets, pellets or rods. Another method of preparing the catalyst is by precipitating or spraying the catalytic material on small particles (suitably of pea size) of pumice, clay, silica or other inert matter.

In accordance with a preferred procedure of the invention, the dialkyl pyridine is vaporized by bubbling a measured quantity of air through the same at a predetermined temperature, the resulting vapors being then mixed with ammonia gas to form a homogeneous mass which after being preheated is passed over the catalyst held in a metal tube preferably of stainless steel equipped with a heating element.

Instead of employing air, oxygen mixed with carbon dioxide or other inert gas, as for instance steam, may be employed. The preheating of the vapor mixture may be accomplished in any desired way as by heating the mixture after the same is formed or by heating any one or two of the vapors before they are mixed.

The reaction in the presence of the catalysts is preferably carried out at atmospheric pressure, or at a superatmospheric pressure adequate to give proper control of the flow of the reactants over the catalysts. Subatmospheric pressure, however, may alternatively be employed to control the flow of vapors, in which case suction is applied at the receiving end of the apparatus.

The yield of the cyanopyridine carboxamides obtained may be greatly increased by employing an excess of both the ammonia and the air or oxygen. Although any excess of these vapors leads to increased yields, high yields are obtained only when very large excesses are employed. For example, about 30 mols of air and about 10 mols of ammnonia for each mol of alkylpyridine ordinarily gives very good results. The amount of excess giving optimum results varies with the type of alkylpyridine treated, with the temperature employed and with the type of catalyst used.

The temperature maintained within the reaction zone may be as low as 250° C., but the best results are obtained around 300° C. and sometimes up to 375° C. Temperatures lower than the limit given usually do not cause the reaction to occur and temperatures higher than the given limit ordinarily cause decomposition or dealkylation of the pyridine. The temperature should be maintained below that at which cyanopyridine is formed, and this limit varies with the catalyst employed. In the continuous process the time of contact of the reactants with the catalyst must be regulated if high yields of the desired compounds are to be obtained. If the time of contact is too short, the yields will be undesirably small for failure of adequate reaction, and if the time is too long, the same result will follow, for the desired products will be destroyed by burning. The optimum time of contact for any particular raw material and conditions can be easily determined by the operator. Ordinarily a space velocity of from 1600 to 3400 leads to satisfactory results, the space velocity being the volume of gas passing through the apparatus per hour divided by the volume of the catalyst and the volume of the gases being measured at standard temperature and pressure.

After the reaction has occurred in the catalytic zone, the effluent gases may be passed through scrubbing towers wherein the vapors of the unreacted dialkylpyridines and the excess ammonia may be collected and recovered for reuse in the process. The cyanopyridine carboxamide formed may thereupon be isolated from the by-products and purified by conventional methods, as by distillation or recrystallization.

For example, our novel process is useful in the preparation of 6-cyanopyridine, 3-carboxamide from aldehyde collidine as described in greater detail below. This compound whose formula is

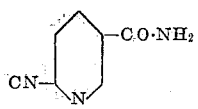

may be hydrolyzed to isocinchomeronic acid, pyridine-2,5-dicarboxylic acid, utilizing an aqueous solution of an alkali metal hydroxide. This compound is bifunctional and has been employed in making long-chain polymers containing basic, heterocyclic nitrogen groups of improved dyeing characteristics. Again, by heating isocinchomeronic acid to a temperature of about 200° C. in water, decarboxylation takes place to yield nicotinic acid, the anti-pellagra vitamin.

In order to illustrate the process of the invention, several examples of preferred procedures are herein set out, the method of preparing the catalyst being also described. The quantities referred to in the examples are by weight.

*Example I*

A quantity of 6-methyl, 3-ethylpyridine (2-methyl, 5-ethylpyridine, aldehydine) contained in a suitable flask was vaporized by pumping heated air there through and the vapors obtained, after being mixed with additional air to provide about 25 parts of air, were mixed with about 11 parts of ammonia, to each part of aldehydine. The resulting mixed vapors were then heated to about 300° C. and passed over a ferric vanadate catalyst contained in a stainless steel tube, at a space velocity of about 2700, the reaction chamber during the reaction being maintained at a temperature of about 300° C. The vapors leaving the reaction zone were passed through an externally cooled vessel wherein most of the reaction product was collected in crystal form and then through a scrubbing tower containing cold water. The reaction product was thereupon collected by dissolving and extracting with a solvent. After distilling off the solvent, the residue was sublimed under a vacuum and recrystallized from methanol. The reaction product obtained was 6-cyanopyridine, 3-carboxamide (2-cyanopyridine, 5-carboxamide), having a melting point of 275–277° C. The mixed melting point determination of the product obtained and a synthetic sample did not show any depression of the melting point.

The catalyst used in the above process was prepared by dissolving 40 grams of ferric chloride in 200 ml. of distilled water and adding the same to a hot solution of 56 grams of ammonium vanadate in 1400 ml. of distilled water. The yellow precipitate which formed was then collected on a filter, washed with water and dried in an oven at 125°–135° C. The dried material was then ground to a coarse powder and the particles of 10 to 20 mesh were separated and charged into the stainless steel tube used in the above procedure.

*Example II*

A vapor mixture consisting of one part 6-methyl, 3-ethylpyridine, 20 parts of air and four parts of ammonia is passed at a space velocity of 2000 through a reaction chamber containing a silver vanadate catalyst. The temperature during the reaction was about 350° C. The reaction product obtained was 6-cyanopyridine, 3-carboxamide.

This catalyst was prepared by reacting a solution of silver nitrate in distilled water with a solution of ammonium metavanadate in distilled water, in mol for mol proportion. The resulting precipitate was collected on a filter, washed with distilled water and dried. After being ground, the 10–20 mesh granules were separated and placed in the reaction chamber.

*Example III*

A vapor mixture consisting of one part of 6-methyl, 3-ethylpyridine, 16 parts of air and 4.5 parts of ammonia was passed at a space velocity of 2300 through a reaction chamber containing a ferric columbate catalyst. The temperature during the reaction was 375° C. The reaction product obtained was 6-cyanopyridine, 3-carboxamide.

This catalyst was prepared by reacting one mole of ferric chloride in aqueous solution with three moles of potassium columbate in aqueous solution. The resulting precipitate was collected on a filter, washed with distilled water and dried. After being ground, the 10–20 mesh granules were separated and placed in the reaction chamber.

*Example IV*

A vapor mixture containing one part of 6-methyl, 3-ethylpyridine, 28 parts of air, and 9.5 parts of ammonia was passed through a reaction chamber containing a vanadium pentoxide catalyst on alumina, at a space velocity of 1600. The temperature during the reaction was 300° C. The reaction product obtained was 6-cyanopyridine, 3-carboxamide.

*Example V*

A vapor mixture consisting of one part of 2,6-lutidine (2,6-dimethylpyridine), 22 parts of air and 15 parts of ammonia was passed through a reaction chamber containing vanadium pentoxide catalyst on alumina, at a space velocity of 2300. The temperature during the reaction was about 305° C. The crude product was fractionated under a vacuum, and two products were separated and purified by recrystallization. The first product isolated and identified was 2-cyano, 6-methylpyridine, a white product. Its melting point was 72–74° C. The mixed melting point determination with an authentic sample showed no depression in the melting point. The second product was 2-cyanopyridine, 6-carboxamide and was also a white product. Its melting point was 184–187° C. Upon alkali hydrolysis the product yielded dipicolinic acid.

The reaction mechanism of the present process has not been definitely determined but it appears certain that the nitrogen of the ammonia joins in each case to that carbon atom of an alkyl chain which is attached to the pyridine ring, and in place of said alkyl group either a nitrile group or a carboxamide group is formed. Since water is formed by the reaction in all cases, it is evident that oxygen of the air combines with the hydrogen liberated from the alkyl group and from the ammonia. When the alkyl group contains two or more carbon atoms, carbon dioxide also forms, indicating that oxygen of the air also combines with all of the carbon atoms in excess of one in the chain of the alkyl radical or radicals.

This application is a continuation-in-part of application Serial No. 100,526 filed June 21, 1949, now abandoned, and application Serial No. 246,866 filed September 15, 1951, now abandoned.

The present invention has been described only as to its preferred embodiments. It should be understood that it is not limited to the specifically mentioned times, temperatures, quantities of chemicals or steps of procedure and that they may be varied without departing from the teachings of the invention except where limited by the scope of the claims appended hereto.

What we claim is:

1. Process for the production of 6-cyano-pyridine-3-carboxamide, which comprises bringing a vapor mixture containing 6-methyl-3-ethyl-pyridine, ammonia and air into contact with a ferric vanadate catalyst, said vapor mixture containing about 25 mols of air and 11 mols of ammonia for each mol of 6-methyl-3-ethyl-pyridine, and maintaining the reaction temperature at about 300° C. while said vapor mixture is in contact with said catalyst.

2. Process for the production of 6-cyano-pyridine-3-carboxamide, which comprises bringing a vapor mixture containing 6-methyl-3-ethyl-pyridine, ammonia and air into a contact with a silver vanadate catalyst, said vapor mixture containing about 20 mols of air and 4 mols of ammonia for each mol of 6-methyl-3-ethyl-pyridine, and maintaining the reaction temperature at about 350° C. while said vapor mixture is in contact with said catalyst.

3. Process for the production of 6-cyano-pyridine-3-carboxamide, which comprises bringing a vapor mixture containing 6-methyl-3-ethyl-pyridine, ammonia and air into contact with a vanadium pentoxide on alumina catalyst, said vapor mixture containing about 28 mols of air and 9.5 mols of ammonia for each mol of 6-methyl-3-ethyl-pyridine, and maintaining the reaction temperature at about 300° C. while said vapor mixture is in contact with said catalyst.

4. Process for the production of 6-cyano-pyridine-3-carboxamide, which comprises bringing a vapor mixture containing 6-methyl-3-ethyl-pyridine, ammonia and air into contact with a ferric columbate catalyst, said vapor mixture containing about 16 mols of air and 4.5 mols of ammonia for each mol of 6-methyl-3-ethyl-pyridine, and maintaining the reaction temperature at about 375° C. while said vapor mixture is in contact with said catalyst.

5. Process for the production of 6-cyano-pyridine-3-carboxamide, which comprises bringing a vapor mixture containing 6-methyl-3-ethyl-pyridine, ammonia and an oxygen-containing gas into contact with a catalyst selected from the group consisting of the oxides and salts of elements of the fifth, sixth and eighth groups of the periodic system, said vapor mixture containing from about 3.2 to 5.6 mols of oxygen and more than one mol of ammonia for each mol of 6-methyl-3-ethyl-pyridine, and being maintained during contact at an elevated reaction temperature of up to about 375° C.

6. Process for the production of 6-cyano-pyridine-3-carboxamide, which comprises bringing a vapor mixture containing 6-methyl-3-ethyl-pyridine, ammonia and an oxygen-containing gas into contact with a catalyst selected from the group consisting of the oxides and salts of elements of the fifth, six and eighth groups of the periodic system, said vapor mixture containing from about 16 to about 28 mols of air and more than one mol of ammonia for each mol of 6-methyl-3-ethyl-pyridine, and being maintained during contact at an elevated reaction temperature of up to about 375° C.

References Cited in the file of this patent

UNITED STATES PATENTS

| | | |
|---|---|---|
| 2,494,204 | Robinson | Jan. 10, 1950 |
| 2,510,605 | Porter | June 6, 1950 |

FOREIGN PATENTS

| | | |
|---|---|---|
| 671,763 | Great Britain | May 7, 1952 |

OTHER REFERENCES

Linstead et al.: Chem. Abstracts, vol. 31, p. 6236 (1937).